(12) United States Patent
Muto et al.

(10) Patent No.: US 9,747,021 B2
(45) Date of Patent: Aug. 29, 2017

(54) DOCUMENT DIVIDING AND MERGING

(71) Applicant: International Business Machines Corporation, Armonk, NY (US)

(72) Inventors: Satoshi Muto, Tokyo-to (JP); Satoshi Yokoyama, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 14/482,283

(22) Filed: Sep. 10, 2014

(65) Prior Publication Data
US 2015/0074520 A1 Mar. 12, 2015

(30) Foreign Application Priority Data

Sep. 10, 2013 (JP) .................................. 2013-187179

(51) Int. Cl.
*G06F 17/00* (2006.01)
*G06F 3/0488* (2013.01)
*G06F 17/21* (2006.01)
*G06F 3/041* (2006.01)
*G06F 17/22* (2006.01)

(52) U.S. Cl.
CPC .......... *G06F 3/0488* (2013.01); *G06F 3/0416* (2013.01); *G06F 17/217* (2013.01); *G06F 17/2229* (2013.01); *G06F 2203/04803* (2013.01); *G06F 2203/04808* (2013.01)

(58) Field of Classification Search
CPC .............................. G06F 17/24; G06F 17/217
See application file for complete search history.

(56) References Cited

U.S. PATENT DOCUMENTS

| 7,260,779 B2 * | 8/2007 | Keyser .................. | G06F 17/217 382/187 |
| 7,409,089 B2 * | 8/2008 | Simmons .............. | G06F 17/242 382/186 |
| 8,804,189 B2 * | 8/2014 | Kai ........................ | G06F 3/125 358/1.15 |

(Continued)

FOREIGN PATENT DOCUMENTS

| JP | 100912323 A | 4/1998 |
| JP | 2004062891 A | 2/2004 |

(Continued)

OTHER PUBLICATIONS

Rudderham, "How to format a page using the Pages app for iPhone and iPad," posted on Aug. 14, 2013, p. 1-10.*

*Primary Examiner* — Amelia Tapp
(74) *Attorney, Agent, or Firm* — Jay Wahlquist

(57) ABSTRACT

Embodiments of the present invention relate to dividing and merging documents on a touch panel. A method includes dividing a document displayed on a touch panel having a display function using an information processing device connected to the touch panel. Positions of two different points on the touch panel are identified in response to a user indicating the two different points in the document. The document is divided, by a computer processor, based on a line segment extending from a starting point to an end point of a traced line traced by the user. The line segment is used as a dividing line in response to the user tracing the traced line on the touch panel so as to traverse the two different points.

20 Claims, 14 Drawing Sheets

(56) References Cited

U.S. PATENT DOCUMENTS

| | | | |
|---|---|---|---|
| 9,013,513 B2* | 4/2015 | Paolini | G06F 3/0483 345/672 |
| 9,134,903 B2* | 9/2015 | Hicks | G06F 3/04883 |
| 9,239,673 B2* | 1/2016 | Shaffer | G06F 3/038 |
| 2002/0152240 A1 | 10/2002 | Kitainik et al. | |
| 2004/0141648 A1* | 7/2004 | Dodge | G06K 9/222 382/188 |
| 2006/0288280 A1* | 12/2006 | Makela | G06F 17/2229 715/205 |
| 2009/0109243 A1* | 4/2009 | Kraft | G06F 3/0481 345/660 |
| 2011/0074699 A1* | 3/2011 | Marr | G06F 3/0485 345/173 |

FOREIGN PATENT DOCUMENTS

| | | | |
|---|---|---|---|
| JP | 2004227564 A | | 8/2004 |
| JP | 2007110679 A | | 4/2007 |
| JP | 2007272904 A | | 10/2007 |
| JP | 2008269044 A | | 11/2008 |
| JP | 2009525538 A | | 7/2009 |
| JP | 2010097473 A | * | 4/2010 |
| JP | 2012079279 A | | 4/2012 |
| JP | 2012088807 A | | 5/2012 |
| JP | 2012108760 A | * | 6/2012 |

* cited by examiner

US 9,747,021 B2

DOCUMENT DIVIDING AND MERGING

FOREIGN PRIORITY

This application claims priority to Japanese Patent Application No. 2013-187179, filed 10 Sep. 2013, and all the benefits accruing therefrom under 35 U.S.C. §119, the contents of which in its entirety are herein incorporated by reference.

BACKGROUND

The present invention relates to document dividing and merging and, more specifically, to dividing and merging documents on a touch panel.

The spread of portable terminals such as smartphones in recent years has increased the need for editing documents on portable terminals. Smartphones are operated almost exclusively using touch panels.

SUMMARY

One embodiment is a method for dividing a document displayed on a touch panel having a display function using an information processing device connected to the touch panel. The method includes identifying the positions of two different points on the touch panel in response to a user indicating the two different points in the document. The document is divided, by an information processing device, based on a line segment extending from a starting point to an end point of a traced line traced by the user. The line segment is used as a dividing line in response to the user tracing the traced line on the touch panel so as to traverse the two different points.

Another embodiment is a system for dividing a document displayed on a touch panel having a display function using an information processing device connected to the touch panel. The system includes a contact detecting unit and an object display unit. The contact detection unit is configured to identify the positions of two different points on the touch panel in response to a user indicating the two different points in the document. The object display unit is configured to divide a document, by a computer processor, based on a line segment extending from a starting point to an end point of a traced line traced by the user. The line segment is used as a dividing line in response to the user tracing the traced line on the touch panel so as to traverse the two different points.

Yet another embodiment is a computer program product for dividing a document displayed on a touch panel. The computer program product includes a computer readable storage medium having program instructions embodied therewith. The program instructions are executable by a processor to cause the processor to perform a method. The method includes identifying the positions of two different points on the touch panel in response to a user indicating the two different points in the document. Further according to the method, the document is divided based on a line segment extending from a starting point to an end point of a traced line traced by the user. The line segment is used as a dividing line in response to the user tracing the traced line on the touch panel so as to traverse the two different points.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The following is a more detailed explanation of a device for displaying, directing, and selecting objects in an embodiment of this disclosure with reference to the drawings. The following embodiments do not limit the disclosure in the scope of the claims. Also, all combinations of characteristics explained in the embodiments are not necessarily required in the technical solution of the various possible embodiments.

Furthermore, the disclosure can be implemented in many different embodiments, and it should be construed that the disclosure is not limited to the following description of embodiments.

The device explained in the following embodiments is a device in which a computer program has been introduced to a computer system. It should be clear to anyone skilled in the art that embodiments could be implemented as a computer program enabling a portion of this device to be executed by a computer. Therefore, the present device for dividing and merging objects displayed on a display device and connected in a location enabling the exchange of data can be implemented as hardware, as software, or as a combination of software and hardware. The software program can be recorded on any computer-readable recording medium such as, for example, a hard disk, a DVD, a CD, an optical recording device, or a magnetic recording device.

In some embodiments, documents, images, and objects displayed on a touch panel can be divided or merged without requiring a pointing device such as a mouse, or mechanical switches and buttons.

Figure 1:
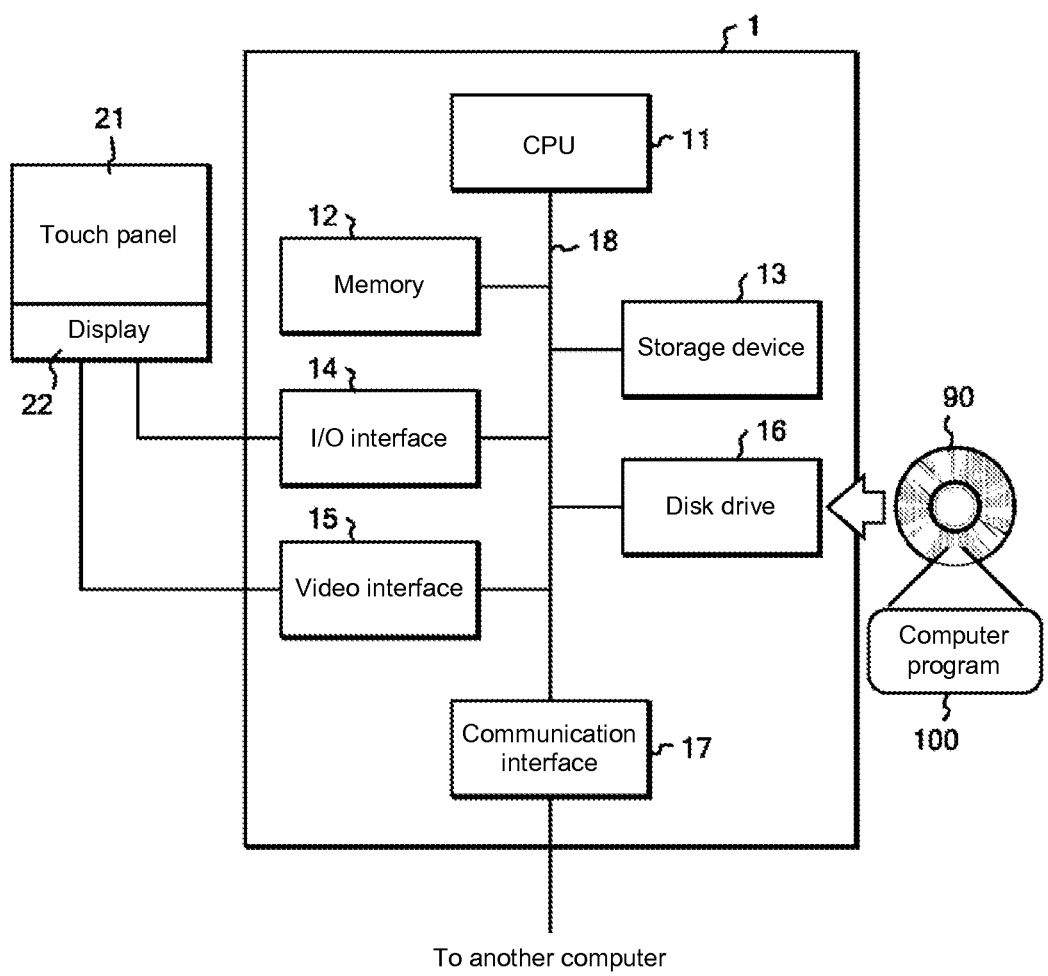
FIG. 1 is a block diagram of an information processing device, according to some embodiments.

FIG. 1 is a block diagram showing the configuration of an information processing device in accordance with an embodiment. The information processing device 1 in the first embodiment includes at least a central processing unit (CPU) 11, a memory 12, a storage device 13, an I/O interface 14, a video interface 15, a disk drive 16, a communication interface 17, and an internal bus 18 connected to this hardware.

The CPU 11 is connected via the internal bus 18 to each hardware unit of the information processing device 1 to control the operations of these hardware units and execute various software functions in accordance with the computer program 100 stored in the storage device 13. The load module executed by the computer program 100 is stored in the memory 12 along with temporary data generated when the computer program 100 is executed.

The storage device 13 is an internal, fixed storage device. The computer program 100 stored in the storage device 13 is read by a portable disk drive 16 from a portable recording medium 90 such as a DVD or CD-ROM on which the program and other data have been recorded, and written to the storage device 13. When the computer program is executed, the program is expanded from the storage device 13 to the memory 12 and executed. The computer program may also be downloaded from another computer connected via the communication interface 17.

Data can be exchanged with another computer by connecting the communication interface 17 both to the internal bus 18 and to an external network such as the internet, a LAN, or a WAN.

The I/O interface 14 is connected to a touch panel 21 to receive data. The video interface 15 is connected to a display 22 integrated with the touch panel 21 to display images of objects. The object dividing and merging mechanism unique to the present invention is a function which does not require that the information processing device 1 be separate from the touch panel 21. The user divides or merges objects displayed on the display 22 using the method and configuration unique to the present invention.

Figure 2:
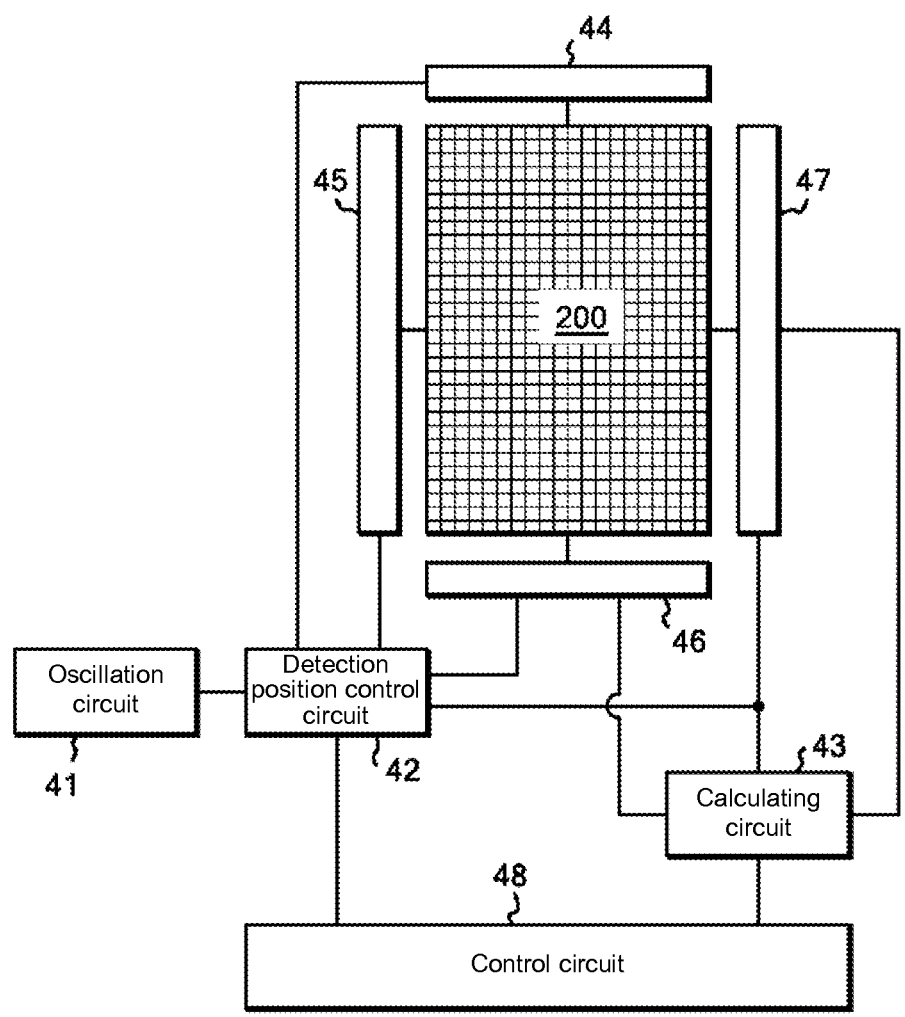
FIG. 2 is a block diagram of a typical touch panel.

FIG. 2 is a block diagram showing the structure of a typical touch panel 21 in an embodiment of the present invention. As shown in FIG. 2, the touch panel 21 in the first embodiment includes at least a touch panel unit (display) 200, an oscillation circuit 41, a detection position control circuit 42, a calculating circuit 43, X-axis input switch 44, Y-axis input switch 45, X-axis output switch 46, Y-axis output switch 47, and a control circuit 48.

The position detection method of the touch panel 21 can be the traditional matrix switch method, resistance film method, surface acoustic wave method, infrared method, electromagnetic induction method, capacitance method, or any combination of these methods or others. In the capacitance method, other contact points can be detected in addition to measuring distances using the electrostatic capacitance between the touch panel and a finger or pointer.

The touch panel unit 200 is a touch panel in which the X-axis electrode lines for detecting positions on the X-axis and the Y-axis electrode lines for detecting positions on the Y-axis are arranged on a matrix. The oscillation circuit 41 is used to generate pulse signals. The detection position control circuit 42 is used to control which of the X-axis electrode lines or Y-axis electrode lines in the touch panel unit 200 to connect.

The calculating circuit 43 detects signals from the touch panel unit 200 to calculate a position closest to or in contact with a finger. The X-axis input switch 44 inputs pulse signals to the input terminals of the X-axis lines, and the Y-axis input switch 45 inputs pulse signals to the input terminals of the Y-axis lines. The X-axis output switch 46 connects the output terminals of the X-axis electrode lines to the calculating circuit 43, and the Y-axis output switch 47 connects the output terminals of the Y-axis electrode lines to the calculating circuit 43.

The control circuit 48 controls all of the operations of the touch panel 21, and instructs the detection position control circuit 42 to detect the position closest to or in contact with a finger when a predetermined number of electrodes are connected. When a position has been detected, an instruction is issued to connect the electrode nearest to the location individually while the other predetermined number of electrodes remains connected.

When the signals related to contact, close proximity or removal of a finger are acquired as signals outputted from the touch panel 21, the distance between the finger and the touch panel 21 can also be estimated based on fluctuations in the electrostatic voltage. The angle of inclination can also be estimated in addition to movement of the finger.

Figure 3:
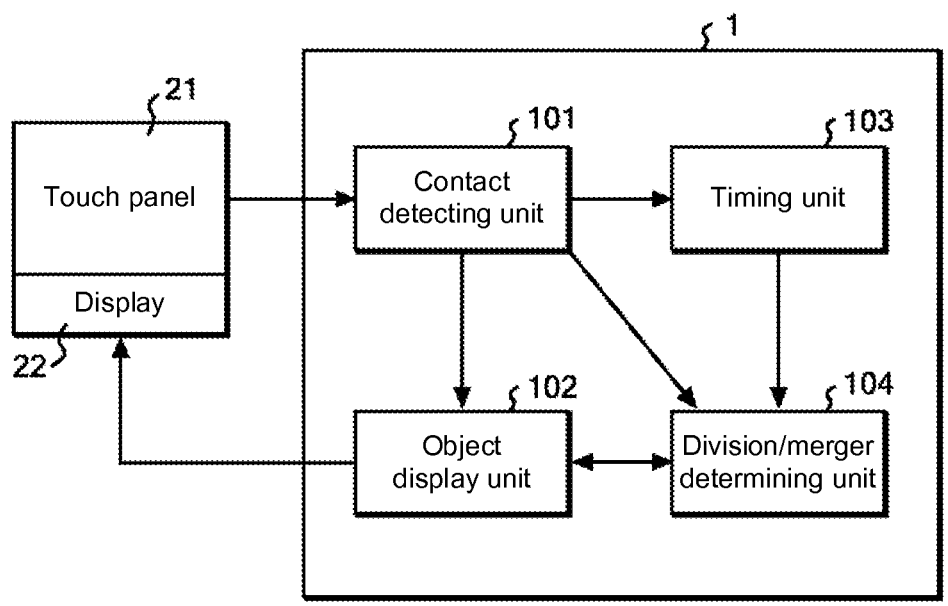
FIG. 3 is a functional block diagram of an information processing device, according to some embodiments.

The following is an explanation of operations performed by a device for dividing and merging objects. FIG. 3 is a functional block diagram of an information processing device 1 in an embodiment of the present invention.

In FIG. 3, the contact detecting unit 101 of the information processing device 1 receives signals outputted from the touch panel 21, and extracts information related to the vertical distance between a fingertip and the touch panel 21, contact with a finger, and movement of a finger. Information related to finger contact indicates how many fingers have made contact with the panel, or how close or how far a finger is from the panel. This information can be determined based on the signals outputted from each sensor in the touch panel 21. When a finger is close, the finger's distance from the panel is also calculated.

The object display unit 102 changes the way in which objects are displayed in response to information related to finger contact and finger movement. For example, the display attributes of an object are changed in response to the distance between a fingertip and the touch panel and movement of a finger over the surface of the touch panel. Here, display attributes refers to colors, shapes, flashing, and brightness.

The timing unit 103 measures the elapsed time since the indication of objects by the fingers. The division/merger determining unit 104 (referred to simply as the determining unit below) determines whether or not a predetermined amount of time (for example, 500 ms) has elapsed since the timing unit 103 started keeping time. The determining unit 104 also monitors finger movement to determine whether the fingers have come to a stop or which direction the fingers are moving on the touch panel, and to determine whether or not this is consistent with object dividing or merging conditions. When the movement or lack of movement is consistent with dividing or merging conditions, an instruction is issued to the object display unit 102 to display the objects in, respectively, a divided or merged state.

In an embodiment, the trigger for dividing or merging objects is determined on the basis of finger movements by the user. However, the embodiments are not restricted to this. For example, selection buttons or external switches may be provided on the touch panel using hardware or software, or the triggers for instructions or selection operations may be vibration information from the device. Other types of trigger signals may also be used.

Figure 4:
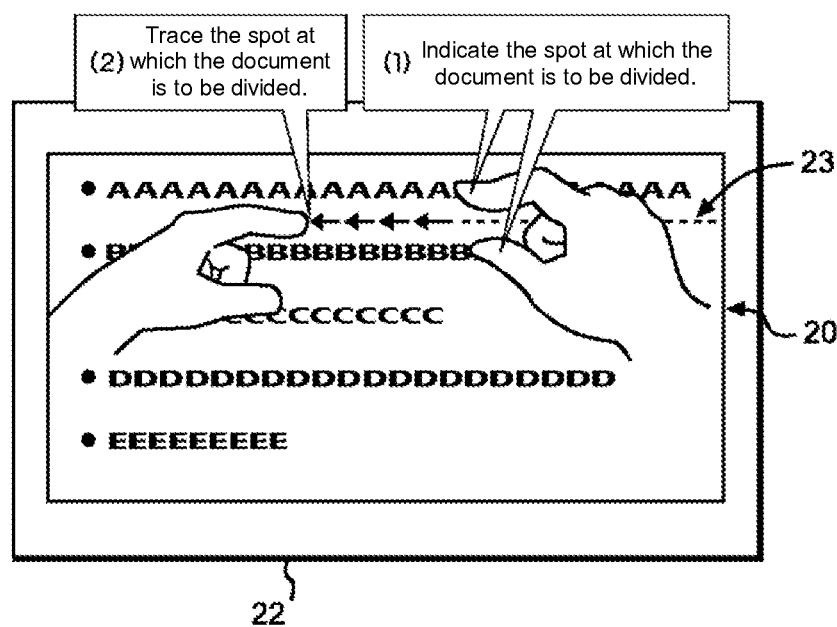
FIG. 4 is an example of an object being divided, according to some embodiments.

FIG. 4 is an example of an object being divided, according to some embodiments. The user opens a document 20 (the object to be divided) on the display 22. The document 20 is presumed to include many lines of text.

The following are aspects of the operation:
(1) The user indicates the spot at which the document is to be divided.
(2) The user traces the spot at which the document is to be divided.
(3) The user slides fingers apart from each other (optional).

The following is a more detailed explanation of these operations. The user touches two different spots in the document 20, so that the spot at which the document is to be divided is between the two spots.

In a first aspect, the division mode is entered when the user traces the spot at which the document is to be divided in such a way as to trace a line segment connecting the two different spots. At this time, the text display attributes of the document 20 may be changed to indicate that the division mode has been entered. Here, a dividing line 23 may be displayed on the display.

In a second aspect, the division mode is entered when a predetermined amount of time has passed while the two points are being touched. At this time, the text display attributes of the document 20 may be changed to indicate that the division mode has been entered. Next, the user traces the spot at which the document is to be divided in such a way as to trace a line segment connecting the two different spots. Here, a dividing line 23 may be displayed on the display.

The document 20 may be divided along the dividing line 23 after (e.g., immediately after) the operations in the first aspect or the second aspect have been performed. Alternatively, the document 20 may be divided into two objects 24, 25 after the user slides the two touched points away from each other as part of division verification.

Figure 5:
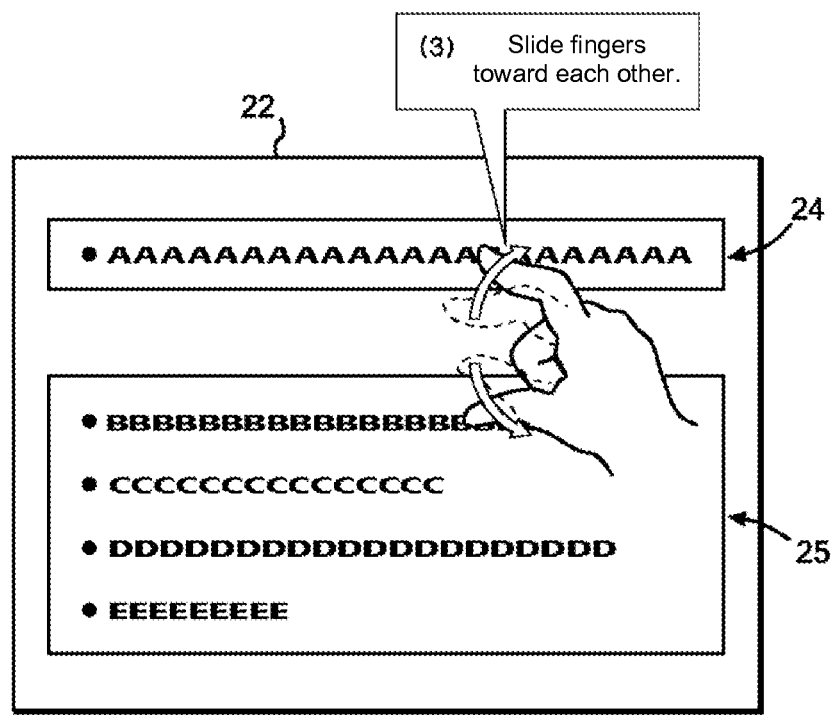
FIG. 5 shows the conclusion of a dividing process, according to some embodiments.

FIG. 5 shows the conclusion of the dividing process in accordance with an embodiment. The document 20 is divided into document 24 and document 25 in response to the user sliding the two indicated points apart from each other.

Figure 6:
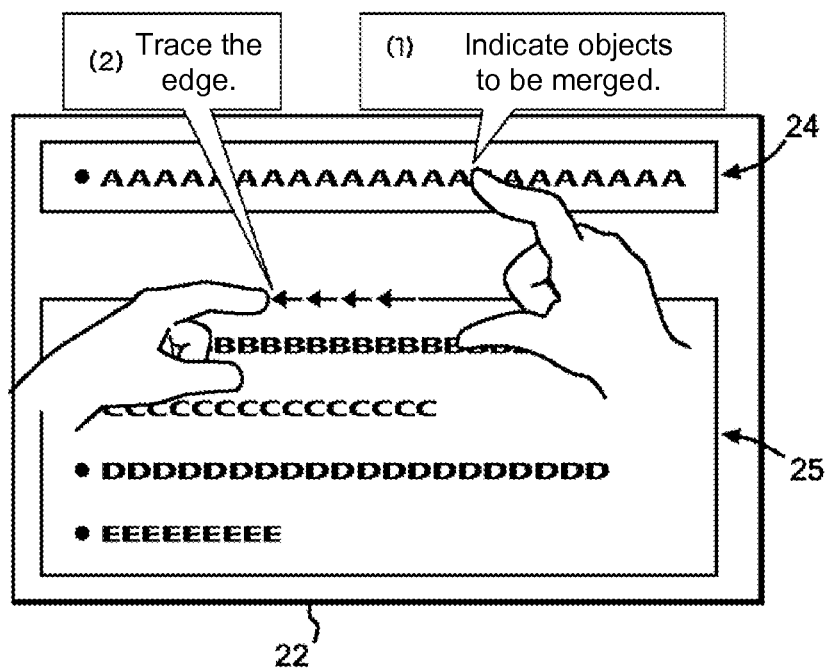
FIG. 6 is an example of objects being merged, according to some embodiments.

FIG. 6 is an example of the two documents, document 24 and document 25, being merged together in accordance with an embodiment.

The following are aspects of the operation:
(1) The user indicates the documents (objects) to be merged.
(2) The user traces the edges along which the documents are to be merged.
(3) The user slides fingers toward each other (optional).

The following is a more detailed explanation of these operations. The user touches each of the documents 24, 25 to be merged together.

In a first aspect, the merger mode is entered when the user traces the bottom edge of document 24 and the top edge of document 25. At this time, the text display attributes of document 24 and document 25 may be changed to indicate that the merger mode has been entered. Here, the traced edges may be highlighted on the display.

In a second aspect, the division mode is entered when a predetermined amount of time has passed while the two documents are being touched at two different points. At this time, the text display attributes of document 24 and document 25 may be changed to indicate that the merger mode has been entered. Next, the user traces the edges along which the documents are to be merged. Here, the traced edges may be highlighted on the display.

Document 24 and document 25 may be merged along the merging edges after (e.g., immediately after) the operations in the first aspect or the second aspect have been performed. Alternatively, document 24 and document 25 may be merged into a single document 20 after the user slides the two touched points toward each other as part of a division verification.

Figure 7:
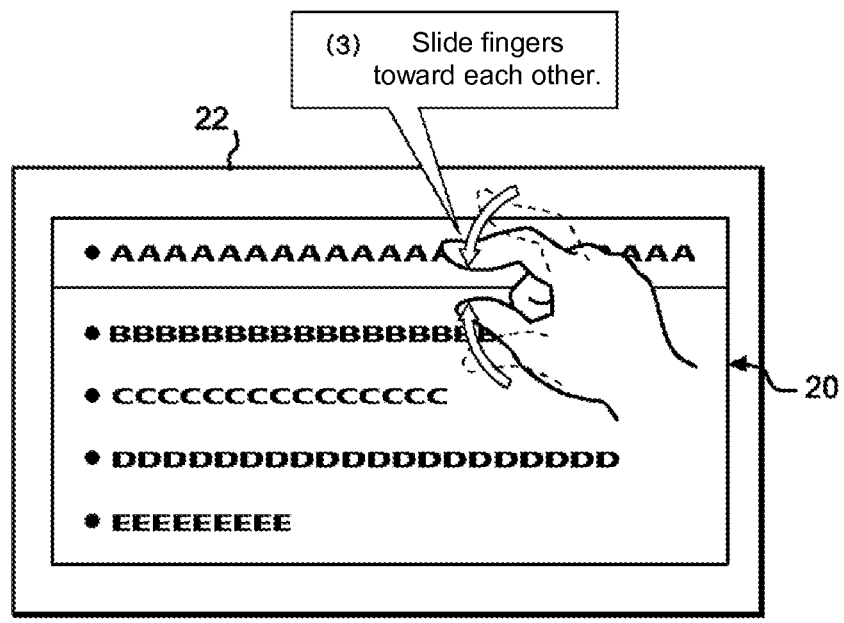
FIG. 7 shows the conclusion of a merging process, according to some embodiments.

FIG. 7 shows the conclusion of the merging process in accordance with an embodiment. A single document 20 is created by merging document 24 and document 25 in response to the user sliding the two indicated points toward each other.

Figure 8:
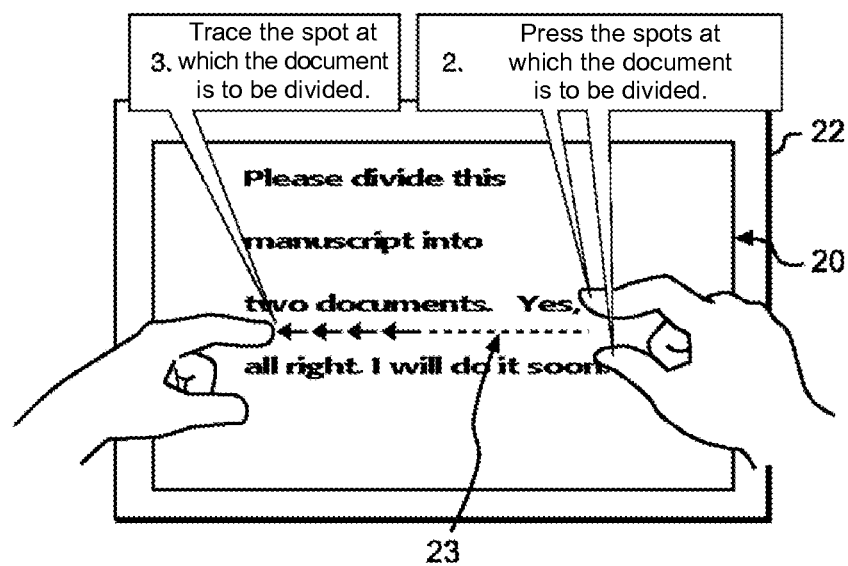
FIG. 8 is a method used to perform the dividing process according to content, according to some embodiments.

FIG. 8 shows a content-based dividing method in accordance with an embodiment. This dividing method is basically the same as the dividing method described above in terms of the finger operations performed by the user. In some embodiments, it differs only in that the dividing line is determined based on the content of the document.

Figure 9:
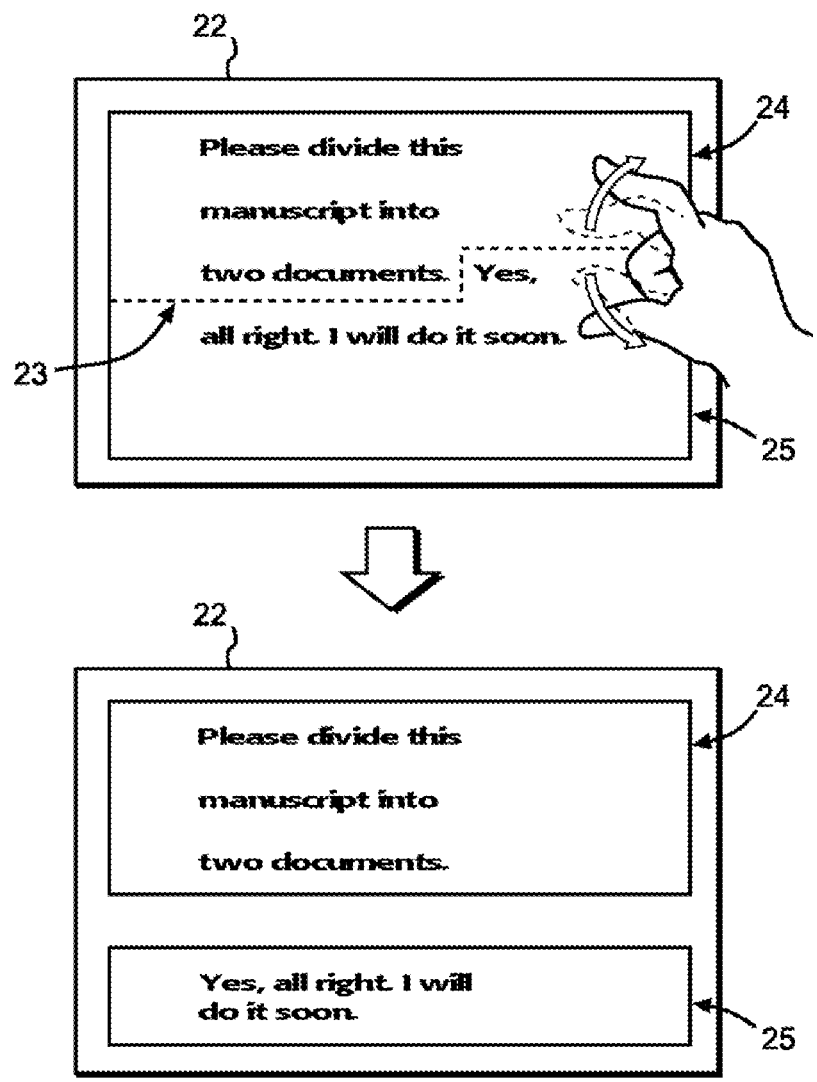
FIG. 9 is a diagram showing the placement of a dividing line and the division of the text, according to some embodiments.

In response to the user touching two desired points in the document 20 and tracing the spot at which the document is to be divided, a line segment corresponding to a division in the content (text) is determined as shown in the embodiment in FIG. 9, and document 24 and document 25 are created accordingly.

More specifically, the text is parsed, the appropriate spot at which to divide the document is determined according to the results, and the document is divided using the appropriate spot (e.g., the end of the sentence). Text parsing can use any well-known method used to divide paragraphs. Further explanation of this method has been omitted. In the present invention, a method may be used to determine the end of a text on the basis of simple punctuation indicating the end of a sentence or paragraph, such as a period or semi-colon.

When the dividing line runs through a paragraph, the division may be placed at the end of a sentence or at the end of the sentence prior to the paragraph. In other words, the appropriate location for the dividing line 23 can be adjusted such that individual paragraphs are not divided. The document 20 is then divided into document 24 and document 25 along the adjusted dividing line 23 in response to the user sliding the two points apart from one another using two fingers.

Figure 10:
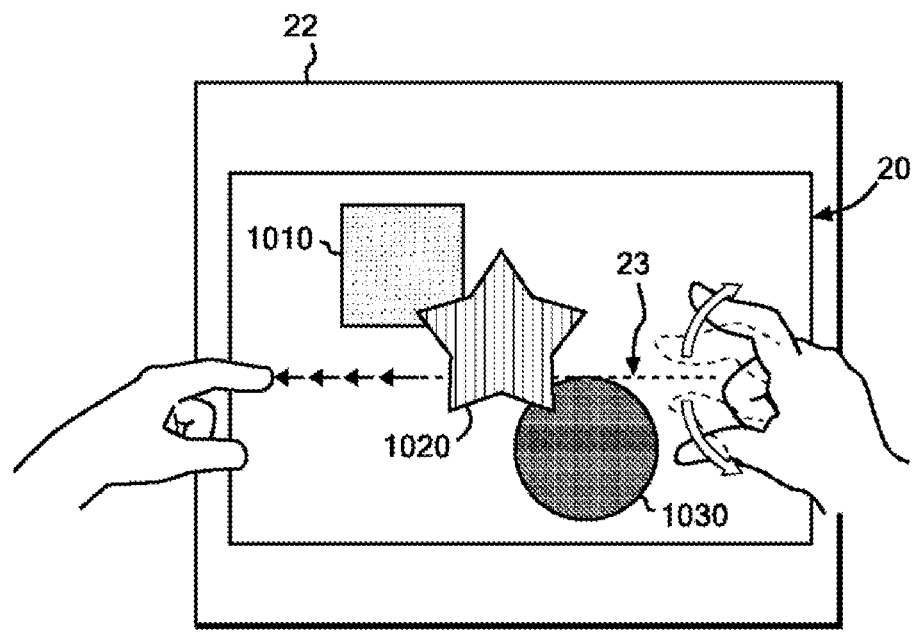
FIG. 10 is an example in which the objects to be divided are graphic objects, according to some embodiments.

FIG. 10 is an example in which the objects to be divided are graphic objects in accordance with an embodiment. The document 20 has a plurality of graphic objects. Here, as part of the dividing operation, the user traces a dividing line on the touch panel while touching two points.

In FIG. 10, as in FIG. 9, the dividing line is determined on the basis of content (graphic objects), and the graphic objects are divided accordingly between the two documents, document 24 and document 25.

More specifically, the center point or the center of gravity of each graphic object is calculated, and the graphic objects are divided according to which of the two display regions partitioned by the dividing line 23 is the region in which the center point of each graphic object is located. When the user slides the fingers so as to separate the two points from each other, the document 20 containing each of the graphic objects is divided into two documents, document 24 and document 25, along the adjusted dividing line 23.

Figure 11:
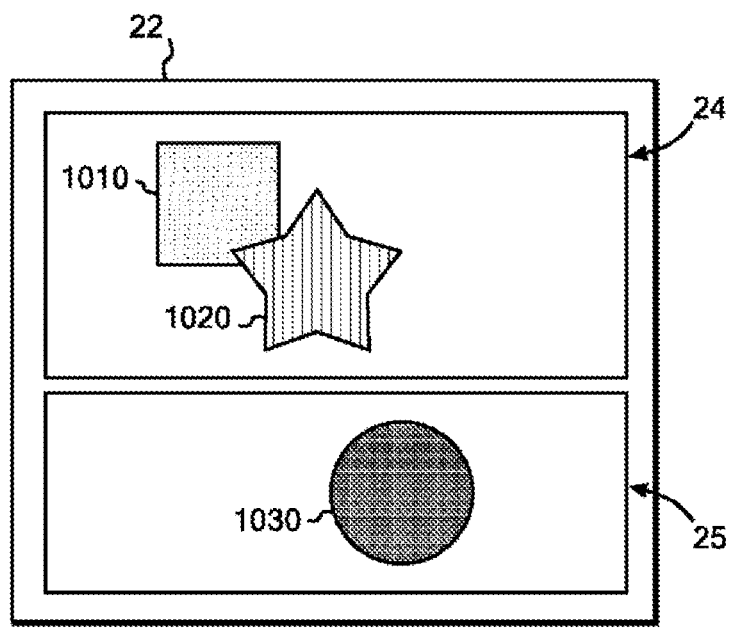
FIG. 11 is an example of a document including a plurality of graphic objects being divided, according to some embodiments.

In the example shown in FIG. 10, the center points of graphic object 1010 and graphic object 1020 are located in the region above the dividing line 23, and the center point of graphic object 1030 is located below the line. When the user slides the two points away from each other using fingers, document 20 is divided into two documents as shown in the embodiment of FIG. 11, in which document 24 includes graphic object 1010 and graphic object 1020, and document 25 includes graphic object 1030.

Figure 12:
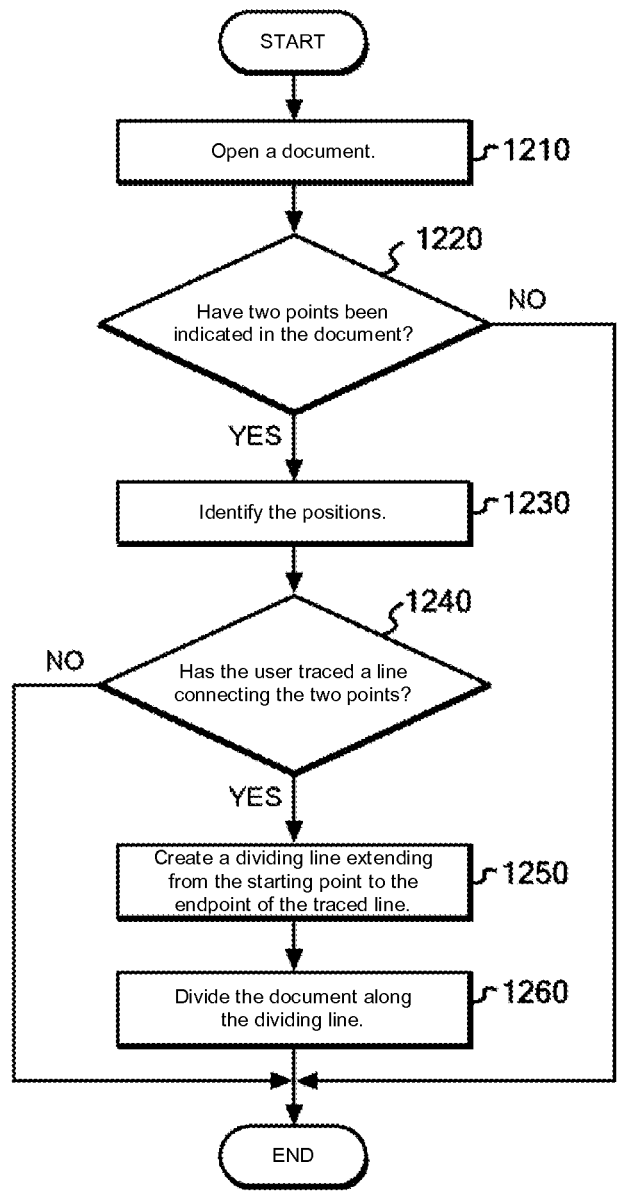
FIG. 12 is a flowchart of dividing operations, according to some embodiments.

FIG. 12 is a flowchart of the dividing operations of some embodiments. As shown, a document is opened in block 1210. In block 1220, it is determined whether the user has indicated two different points in the document. The determination of points may be confirmed when a predetermined amount of time has passed while the points are being indicated. Once determined, the locations of the two points are identified. In block 1240, it is determined whether the user has traced a line segment traversing the two points on the touch panel. Here, "traverse" does not have to mean a straight line directly connecting the two points, but can also refer to a line in which traced line segments extend so as to connect the two points. When it has been determined that a line has been traced, the line segment extending from the starting point to the end point of the traced line is displayed as the dividing line in block 1250. In block 1260, the document is divided along the dividing line.

The division determination may be made using as the trigger an operation in which the two points indicated by the user are slid away from each other using fingers.

Figure 13:
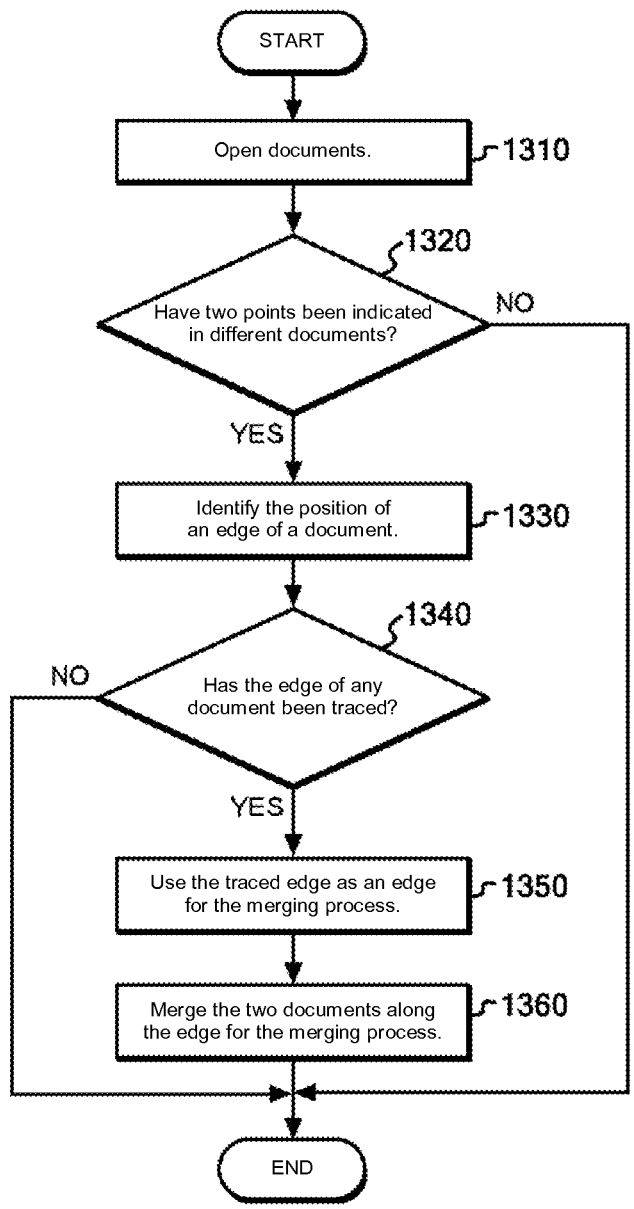
FIG. 13 is a flowchart of merging operations, according to some embodiments.

FIG. 13 is a flowchart of the merging operations of some embodiments. As shown, a document is opened in block 1310. In block 1320, it is determined whether the user has indicated two points in different documents. The determination of points may be confirmed when a predetermined amount of time has passed while the points are being indicated. Once determined, the locations of the two points are identified. In block 1340, it is determined whether the user has traced the edge of either document. When it has been determined that an edge has been traced, the traced edge is displayed as a merger edge in block 1350. In block 1360, the two documents are merged along the merger line.

Figure 14:
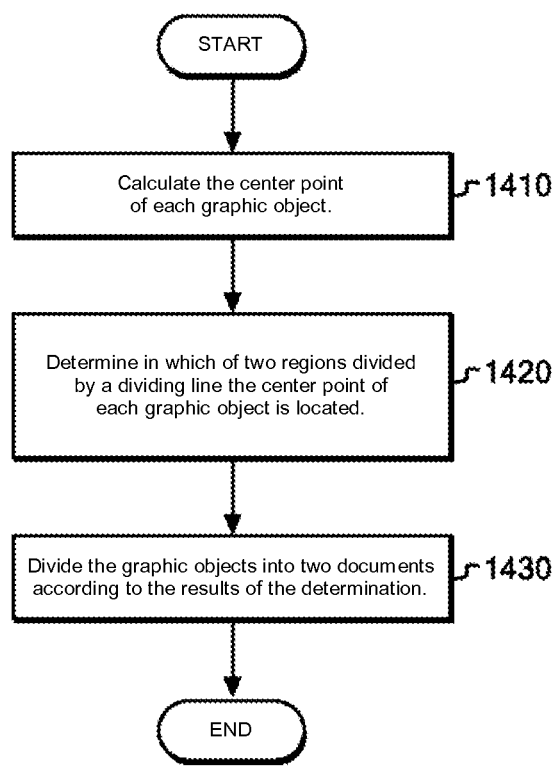
FIG. 14 is a flowchart of dividing decisions made when a document includes graphic objects, according to some embodiments.

FIG. 14 is a flowchart of dividing decisions made when a document includes graphic objects, according to some embodiments. In block 1410, the center point of each graphic object is calculated. The center of gravity can be calculated instead of the center point. The method used to calculate the center point of the graphic objects can be any method common in the art. Further explanation of this method has been omitted. Next, in block 1420, it is determined in which of the two display regions partitioned by the dividing line the center point of each graphic object is located. In block 1430, the document is divided into two documents containing graphic objects according to the results of this determination.

In another operational aspect, the text, images, and graphics may be mixed together. In this case, an embodiment of this disclosure may use any combination of these basic operations. Any trigger used to divide, merge, and indicate objects may be a physical switch built into the touch panel, or an acceleration sensor, vibration sensor, or gyro installed separately from the information processing device.

The various embodiments are by no means restricted to the examples described above. Various changes and improvements are possible without departing from the spirit and scope of this disclosure.

The invention claimed is:

1. A method for dividing a document displayed on a touch panel having a display function using an information processing device connected to the touch panel, the method comprising:

identifying the positions of two different points on the touch panel in response to a user indicating the two different points in the document;

identifying a traced line extending between the two different points in the document in response to a user tracing the traced line on the touch panel;

adjusting the traced line based on content of the document; and dividing, by an information processing device, the document into two separate documents based on a line segment extending from a starting point to an end point of the adjusted traced line, wherein the line segment is used as a dividing line in response to the user tracing the traced line on the touch panel so as to divide the document between the two different points.

2. The method according to claim 1, further comprising displaying the line segment.

3. The method according to claim 1, wherein the dividing comprises dividing the document using the line segment extending from the starting point to the end point of the traced line, in response to the user sliding the two different points away from each other.

4. The method according to claim 1, wherein the document includes text, and adjusting the traced line comprises:
parsing the text;
determining an appropriate spot for dividing the text on the basis of the parsing; and
adjusting the traced line based on the determined appropriate spot for dividing the text.

5. The method according to claim 4, wherein determining the appropriate spot for dividing the text on the basis of the parsing comprises identifying at least one of an end of a sentence and an end of a paragraph.

6. The method according to claim 1, wherein the document includes a plurality of graphic objects, and adjusting the traced line comprises:
calculating a center point of each graphic object;
determining a center point of each display region divided by the traced line; and
adjusting the traced line based on the calculated center point of each graphic object and the determined center point of each display region so the graphic objects are separated and each of the graphic objects is included entirely in one of the two separate documents.

7. The method according to claim 1, further comprising:
identifying the edges of a first document and a second document in response to the user indicating a first point in the first document and a second point in the second document; and
merging the first document and the second document using a traced edge as the merger edge in response to detecting the user tracing a line along an edge of either one of the first and second documents.

8. A system for dividing a document displayed on a touch panel having a display function using an information processing device connected to the touch panel, the system comprising:
an information processing device configured to:
identify the positions of two different points on the touch panel in response to a user indicating the two different points in the document;
identify a traced line extending between the two different points in the document in response to a user tracing the traced line on the touch panel;
adjust the traced line based on content of the document; and divide the document into two separate documents based on a line segment extending from a starting point to an end point of the adjusted traced line, wherein the line segment is used as a dividing line in response to the user tracing the traced line on the touch panel so as to divide the document between the two different points.

9. The system of according to claim 8, wherein the information processing device is further configured to display the line segment.

10. The system of according to claim 8, wherein, to perform the dividing, the information processing device is further configured to divide the document using the line segment extending from the starting point to the end point of the traced line, in response to the user sliding the two different points away from each other.

11. The system of according to claim 8, wherein the document includes text and, to adjust the traced line, the information processing device is configured to:
   parse the text;
   determine an appropriate spot for dividing the text on the basis of the parsing; and
   adjust the traced line based on the determined appropriate spot for dividing the text.

12. The system according to claim 11, wherein, to determine the appropriate spot for dividing the text on the basis of the parsing, the information processing device is configured to identify at least one of an end of a sentence and an end of a paragraph.

13. The system of according to claim 8, wherein the document includes a plurality of graphic objects and, to adjust the traced line, the information processing device is further configured to:
   calculate a center point of each graphic object;
   determine a center point of each display region divided by the traced line; and
   adjust the traced line based on the calculated center point of each graphic object and the determined center point of each display region so the graphic objects are separated and each of the graphic objects is included entirely in one of the two separate documents.

14. The system of according to claim 8, wherein information processing device is further configured to:
   identify the edges of a first document and a second document in response to the user indicating a first point in the first document and a second point in the second document; and
   merge the first document and the second document using a traced edge as the merger edge in response to detecting the user tracing a line along an edge of either one of the first and second documents.

15. A computer program product for dividing a document displayed on a touch panel, the computer program product comprising a computer readable storage medium having program instructions embodied therewith, the program instructions executable by a processor to:
   identify the positions of two different points on the touch panel in response to the user indicating the two different points in the document;
   identify a traced line extending between the two different points in the document in response to a user tracing the traced line on the touch panel;
   adjust the traced line based on content of the document; and
   divide the document into two separate documents based on a line segment extending from a starting point to an end point of the adjusted traced line traced, wherein the line segment is used as a dividing line in response to the user tracing the traced line on the touch panel so as to divide the document between the two different points.

16. The computer program product according to claim 15, the processor being further configured to display the line segment.

17. The computer program product according to claim 15, wherein the dividing further comprises dividing the document using the line segment extending from the starting point to the end point of the traced line, in response to the user sliding the two different points away from each other.

18. The computer program product according to claim 15, wherein the document includes text, and adjusting the traced line further comprises:
   parsing the text;
   determining an appropriate spot for dividing the text on the basis of the parsing; and
   adjusting the traced line based on the determined appropriate spot for dividing the text.

19. The computer program product according to claim 15, wherein the document includes a plurality of graphic objects, and the dividing further comprises:
   calculating a center point of each graphic object;
   determining a center point of each display region divided by the traced line; and
   adjusting the traced line based on the calculated center point of each graphic object and the determined center point of each display region so the graphic objects are separated and each of the graphic objects is included entirely in one of the two separate documents.

20. The computer program product according to claim 15, the processor being further configured to:
   identify the edges of a first document and a second document in response to the user indicating a first point in the first document and a second point in the second document; and
   merge the first document and the second document using a traced edge as the merger edge in response to detecting the user tracing a line along an edge of either one of the first and second documents.

* * * * *